(12) United States Patent
Fujisawa et al.

(10) Patent No.: US 9,663,222 B2
(45) Date of Patent: May 30, 2017

(54) THRUST VECTORING APPARATUS AND FLYING OBJECT HAVING THRUST VECTORING APPARATUS

(71) Applicant: MITSUBISHI HEAVY INDUSTRIES, LTD., Tokyo (JP)

(72) Inventors: Fuminori Fujisawa, Tokyo (JP); Hiroyuki Tani, Tokyo (JP); Daisuke Hyuga, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 213 days.

(21) Appl. No.: 14/746,055

(22) Filed: Jun. 22, 2015

(65) Prior Publication Data

US 2016/0075428 A1     Mar. 17, 2016

(30) Foreign Application Priority Data

Sep. 17, 2014   (JP) .................. 2014-189144

(51) Int. Cl.
*B64C 15/02* (2006.01)
*F42B 10/66* (2006.01)

(52) U.S. Cl.
CPC ............ *B64C 15/02* (2013.01); *F42B 10/665* (2013.01)

(58) Field of Classification Search
CPC ........ B64D 29/04; B64D 33/04; B64C 15/02; B64C 15/00; B64C 29/00; B64C 29/04; F02K 1/70
See application file for complete search history.

(56) References Cited

U.S. PATENT DOCUMENTS

| | | | | |
|---|---|---|---|---|
| 3,786,993 A * | 1/1974 | Burgess | ................... | F02K 9/90 239/265.19 |
| 3,986,683 A * | 10/1976 | Ellison | ................. | F42B 10/665 239/265.19 |
| 4,272,040 A * | 6/1981 | Bastian | ..................... | F02K 9/90 239/265.19 |
| 4,274,610 A * | 6/1981 | Bastian | ................ | F42B 10/665 239/265.19 |
| 4,587,806 A * | 5/1986 | Madden | .................. | F02K 1/006 239/265.37 |
| H384 H * | 12/1987 | Dillinger | ................... | F02K 9/90 60/230 |
| 4,798,328 A * | 1/1989 | Thayer | .................... | F02K 1/002 239/1 |
| 4,836,451 A * | 6/1989 | Herrick | ................... | F02K 1/008 239/265.27 |

(Continued)

FOREIGN PATENT DOCUMENTS

JP      2004-524501      8/2004
WO      02/073118      9/2002

*Primary Examiner* — Justin Benedik
(74) *Attorney, Agent, or Firm* — Wenderoth, Lind & Ponack, L.L.P.

(57) ABSTRACT

The thrust vectoring apparatus has a nozzle, a jet tab arranged behind the nozzle, a rotation shaft 30 connected to the jet tab, and a gas seal member arranged on an outer circumferential surface of the rotation shaft. The rotation shaft is connected to the jet tab, and has the protrusion in the redial direction out of the rotation shaft on the rear side of the gas seal member. The protrusion restrains that the combustion gas exhausted from the nozzle flows toward the gas seal member.

11 Claims, 13 Drawing Sheets

(56) References Cited

U.S. PATENT DOCUMENTS

| | | | | |
|---|---|---|---|---|
| 4,848,664 | A | * | 7/1989 | Thayer .................... F02K 1/008 239/265.29 |
| 4,978,071 | A | * | 12/1990 | MacLean ................ F02K 1/006 239/265.19 |
| 5,320,304 | A | * | 6/1994 | Danielson ............... F42B 10/60 239/265.19 |
| 5,511,745 | A | * | 4/1996 | Faupell ................... F02K 1/008 239/265.19 |
| 5,687,907 | A | * | 11/1997 | Holden ................... B64C 15/02 239/265.35 |
| 5,769,317 | A | * | 6/1998 | Sokhey ................... B64C 15/02 239/1 |
| 5,806,791 | A | * | 9/1998 | Hatalsky ................. F02K 9/805 244/3.24 |
| 6,318,668 | B1 | * | 11/2001 | Ulanoski ............. B64C 29/0058 239/265.19 |
| 6,548,794 | B2 | * | 4/2003 | Facciano .................. F02K 9/90 239/265.15 |
| 7,406,821 | B2 | * | 8/2008 | Hervio .................... F02K 9/978 239/265.15 |
| 2007/0095972 | A1 | * | 5/2007 | Buffenoir ............... B64C 15/02 244/15 |
| 2008/0258016 | A1 | * | 10/2008 | Gukeisen ............... B64D 29/00 244/53 R |
| 2010/0180568 | A1 | * | 7/2010 | Sachs ....................... F02C 5/02 60/39.511 |

* cited by examiner

FWD  RWD

THRUST VECTORING APPARATUS AND FLYING OBJECT HAVING THRUST VECTORING APPARATUS

CROSS-REFERENCE

This application is based on Japanese Patent Application No. JP 2014-189144 and claims a priority of that application. The disclosure thereof is incorporated herein by reference.

TECHNICAL FIELD

The present invention relates to a thrust vectoring apparatus and a flying object which has the thrust vectoring apparatus.

BACKGROUND ART

A thrust vectoring apparatus using a jet tab is known. The jet tab is inserted in a nozzle output opening to increase the pressure at the upper stream of an insertion position of the jet tab and to make a pitch control and a yaw control of a missile and so on possible.

In relation to the above, Patent Literature 1 (JP 2004-524501A) discloses a jet control system in which a blast shielding body is arranged in adjacent to a control wing.

CITATION LIST

[Patent literature 1] JP 2004-524501A

SUMMARY OF THE INVENTION

An object of the present invention is to provide a thrust vectoring apparatus which can protect a gas seal member, and a flying object using the thrust vectoring apparatus.

Other objects and advantages of the present invention could be easily understood based on the following description and the attached drawings.

In an aspect of the present invention, the thrust vectoring apparatus includes a nozzle having a nozzle output opening which emits a combustion gas in a rear direction; a jet tab arranged on the rear side of the nozzle; a rotation shaft connected to the jet tab to be rotatable around a rotation axis; a driving mechanism to rotate the rotation shaft around the rotation axis; and a gas seal member arranged on an outer circumferential surface of the rotation shaft to prevent the combustion gas from invading toward the driving mechanism. The jet tab rotates in a plane intersecting with a longitudinal center axis of the nozzle by the rotation shaft rotating around the rotation axis, to move from an operation position where the jet tab overlaps with the nozzle output opening to a standby position where the jet tab does not overlap with the nozzle output opening. A first gap is formed between the jet tab and a rear end surface of the nozzle. The rotation shaft has a protrusion on the rear side of the gas seal member, and the protrusion protrudes to the radial direction out of the rotation shaft to restrain that the combustion gas which flows from the first gap flows toward the gas seal member.

In the above thrust vectoring apparatus, the protrusion may be an annular protrusion.

In the above thrust vectoring apparatus, the rotation shaft may further have a rotation shaft receiving member with a through-hole in which the rotation shaft is inserted. Also, the gas seal member may be arranged between the outer circumferential surface of the rotation shaft and the inner surface of the through-hole. Moreover, the outer diameter of the annular protrusion may be larger than the inner diameter of the through-hole.

In the above thrust vectoring apparatus, the rear end surface of the protrusion may be located in front of the outer circumferential edge of the rear end surface of the nozzle.

In the above thrust vectoring apparatus, the protrusion may have an inclination section. Also, the rear end surface of the inclination section may have a first inclination surface which inclines toward the front side in the radial direction out of the nozzle from the longitudinal center axis of the nozzle. Also, the first inclination surface may guide a part of the combustion gas which flows from the first gap.

In the above thrust vectoring apparatus, the protrusion may have a flat section. Also, when the jet tab is in the operation position, the flat section may be located in the radial direction out of the nozzle from the inclination section. Moreover, the flat section may vector the part of the combustion gas which is guided by the rear end surface of the inclination section.

In the above thrust vectoring apparatus, the rear end surface of the nozzle may have a second inclination surface which is inclined to the front side along the radial direction out of the nozzle. An angle between a first surface which is perpendicular to the rotation axis and the first inclination surface is may be larger than an angle between a second surface which is parallel to the first surface and the second inclination surface.

In the above thrust vectoring apparatus, a plurality of protrusions may be arranged on the rotation shaft along the longitudinal direction of the rotation shaft.

The above thrust vectoring apparatus may further have a bent passage to decelerate the flow of the combustion gas which goes around the protrusion and heads for the gas seal member.

In another aspect of the present invention, the flying object has the thrust vectoring apparatus. The thrust vectoring apparatus is equivalent to either of the above-mentioned thrust vectoring apparatuses.

In still another aspect of the present invention, the thrust vectoring apparatus has a nozzle with a nozzle output opening from which a combustion gas is emitted into a rear direction; a jet tab arranged on the rear side of the nozzle; a rotation shaft connected to the jet tab to be rotatable around a rotation axis; a rotation shaft receiving member having a through-hole in which the rotation shaft is inserted; a driving mechanism configured to rotate the rotation shaft around the rotation axis; a gas seal member arranged between an outer circumferential surface of the rotation shaft and an inner surface of the through-hole. The rotation shaft has an annular protrusion in a radial direction out of the rotation shaft between the gas seal member and the jet tab. The outer diameter of the annular protrusion is larger than the inner diameter of the through-hole. A first gap is formed between the jet tab and the rear end surface of the nozzle. The shortest distance between the outer circumferential edge of the rear end surface of the nozzle and the jet tab is smaller than the shortest distance between the rear end surface of the annular protrusion and the jet tab.

According to the present invention, the thrust vectoring apparatus which can protect the gas seal member and the flying object using the thrust vectoring apparatus can be provided.

DESCRIPTION OF EMBODIMENTS

Hereinafter, embodiments will be described with reference to the attached drawings.
(Definition in Direction)
In this Specification, as shown in FIGS. 3, 4, 6A, 7 to 9, 11A, 11B, and 12, the direction in which a combustion gas is exhausted is defined as a "rear direction (RWD)" and a direction opposite to the rear direction is defined as a "forward direction (FWD)". Also, when a longitudinal center axis of a nozzle is set as an X axis, a direction in which the combustion gas is exhausted along the X axis is defined as a +X direction, and a direction opposite to the +X direction is defined as a −X direction. The "rear direction" is same as the "+X direction" and the "forward direction" is same as the "−X direction". Note that the central axis of the nozzle along the X axis is defined as a longitudinal center axis of the nozzle irrespective of the length of the nozzle.
(Definition of Terms)
In the Specification, when the sectional shape of the nozzle which is perpendicular to a longitudinal direction of the nozzle has a circular shape, the longitudinal center axis of the nozzle is defined as a line which passes through a center of the circle. When the sectional shape of the nozzle which is perpendicular to the longitudinal direction of the nozzle has a non-circular shape, the longitudinal center axis of the nozzle is defined as a line which passes through an area center of a non-circular shape.

Figure 1:
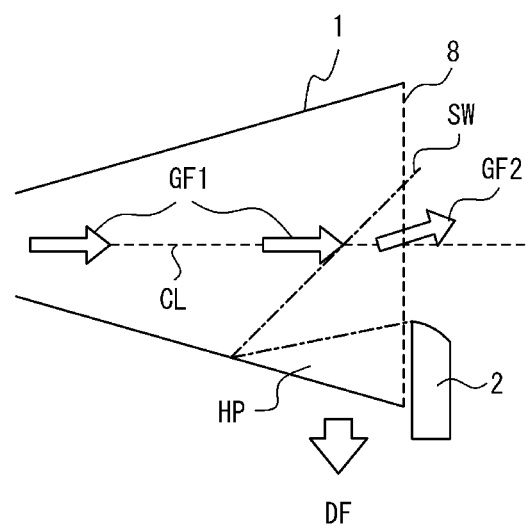
FIG. 1 is diagram showing a principle of thrust vectoring by a jet tab.

(Principle of Thrust Vectoring by Jet Tab)
Referring to FIG. 1, the principle of thrust vectoring by a jet tab will be described. FIG. 1 schematically shows a side sectional view of the nozzle 1. The jet tab 2 (the jet tab is sometimes called a vectoring body or a spoiler) is arranged on the rear side of the nozzle 1 so that a part of the jet tab 2 overlaps with a nozzle output opening 8.

A mainstream GF1 of combustion gas which flows in the rear direction along the longitudinal center axis CL of the nozzle 1 generates a high-pressure region HP in front of the jet tab 2 by the jet tab 2. In the high-pressure region HP, the inflow of the combustion gas mainstream GF1 is restrained. A diagonal shock wave SW is generated from the front part of the high-pressure region HP as a start point. The combustion gas mainstream GF1 is vectored (deflected) with the diagonal shock wave SW to generate a vectored flow GF2. As the reaction of vectoring of the combustion gas mainstream GF1, a vectoring force DF acts on the nozzle 1. The thrust to the nozzle 1 (or, a flying object having the nozzle 1) in the forward direction is vectored by the vectoring force DF.

Figure 2A:
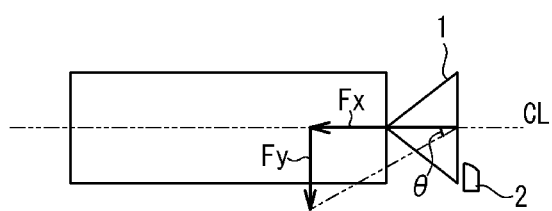
FIG. 2A is diagram showing a definition of a thrust vectoring angle.
Figure 2B:
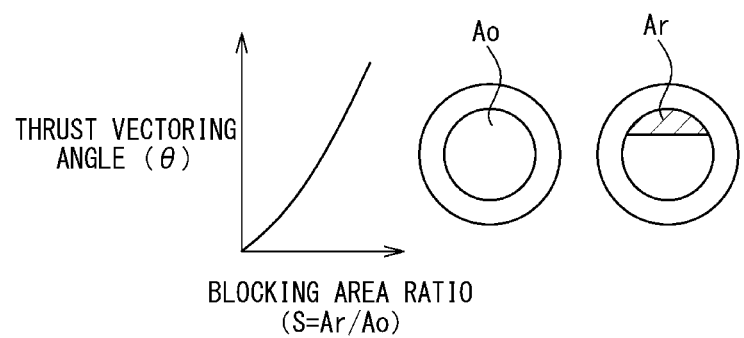
FIG. 2B is a graph showing a relation between the thrust vectoring angle and a ratio of a blocking area to an area of the nozzle output opening.
Figure 3:
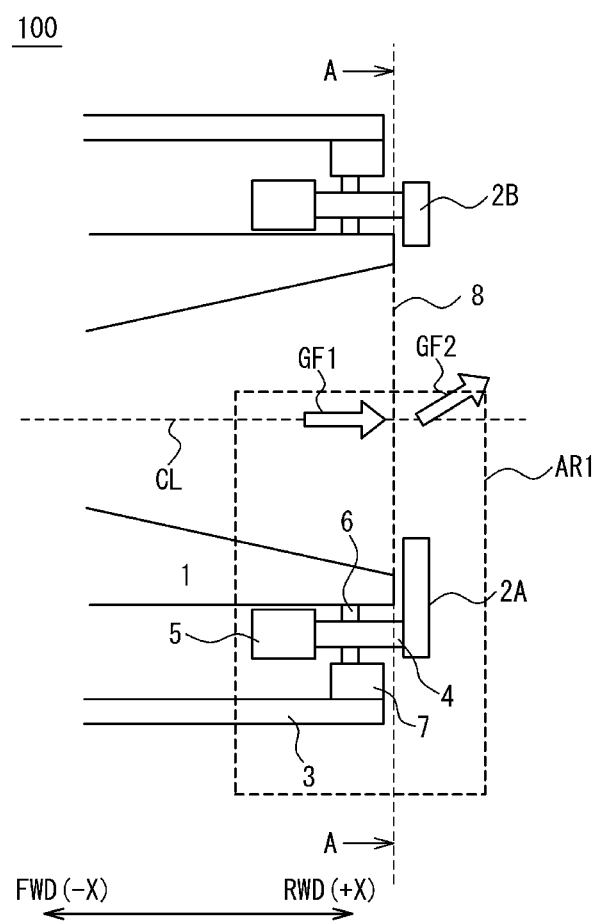
FIG. 3 is a side sectional view showing the thrust vectoring apparatus.
Figure 4:
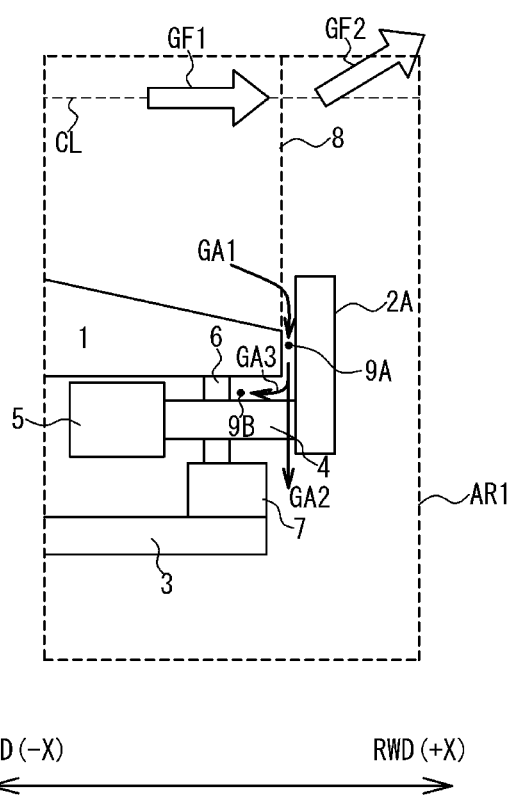
FIG. 4 is a side sectional view showing the thrust vectoring apparatus and is an expanded view of an area AR1 in FIG. 3.
Figure 5:
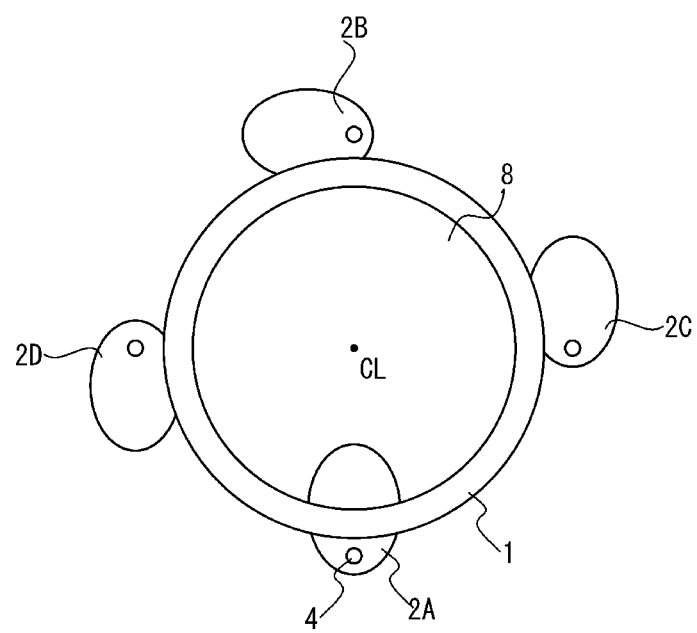
FIG. 5 is a sectional view along the line A-A in FIG. 3.

(Relation Between Thrust Vectoring Angle and Ratio of Blocking Area to Area of Nozzle Output Opening)
FIG. 2A is a diagram showing a definition of the thrust vectoring angle. FIG. 2A is a side view of a rocket motor. A longitudinal axial thrust Fx of the nozzle 1 and the above-mentioned vectoring force DF, i.e. a vectoring force Fy act on the rocket motor. At this time, the thrust vectoring angle θ is defined as Arc tan(Fy/Fx). FIG. 2B is a graph showing a relation of the ratio of blocking area to area of the nozzle output opening and the thrust vectoring angle θ. The area of the nozzle output opening (area in a fully opened condition) is defined as Ao and the blocking area of the nozzle output opening by the jet tab is defined as being Ar. Thus, the ratio of blocking area Ar to the area Ao in the fully opened condition is defined as a blocking area ratio (S=Ar/Ao). As understood from FIG. 2B, the thrust vectoring angle θ is a monotonously increasing function of the blocking area ratio S. In other words, as the blocking area Ar by the jet tab increases, the thrust vectoring angle θ increases.
(Problems Recognized by the Inventors)
Referring to FIG. 3 to FIG. 5, the problems recognized by the inventors will be described. FIG. 3 and FIG. 4 are side sectional views of the thrust vectoring apparatus. Also, FIG. 4 is an expanded view of an area of AR1 of FIG. 3. FIG. 5 is a sectional view of the nozzle 1 along a line A-A in FIG. 3.

First, referring to FIG. 3, an example of the thrust vectoring apparatus 100 will be described. The thrust vectoring apparatus 100 is provided with the nozzle 1, the jet tabs 2A to 2D (Note that the jet tabs 2C and 2D are not shown in FIG. 3), a nozzle outer wall 3, a rotation shaft 4, a driving mechanism 5, a gas seal member 6, and a flange section 7.

The nozzle 1 contains the longitudinal center axis CL of the nozzle and the nozzle output opening 8. The combustion gas flows through the inside of the nozzle 1. The combustion gas mainstream GF1 which flows through the inside of the nozzle 1 is vectored and converted into the vectored flow GF2 by the jet tab 2A according to the above-mentioned principle. Most of the combustion gas is emitted from the nozzle output opening 8 into the rear direction. Note that in FIG. 3, although the above-mentioned vectoring force is generated because the jet tab 2A overlaps with the nozzle output opening 8 (in an operation position), the above-mentioned vectoring force is not generated because the jet tabs 2B to 2D do not overlap with the nozzle output opening 8 (in a standby position) (Note that the jet tabs 2C and 2D are not shown in FIG. 3. If necessary, reference to FIG. 5).

In order to move the jet tab 2A from the standby position to the operation position (or, from the operation position to the standby position), the rotation shaft 4 and the driving mechanism 5 are used. The rotation shaft 4 is connected to the jet tab 2A. Also, the driving mechanism 5 transfers power to the rotation shaft 4. By transferring the power of the driving mechanism 5 to the rotation shaft 4, the rotation shaft 4 is driven to rotate, together with the jet tab 2A. The jet tab 2A moves from the standby position to the operation position as the rotation shaft 4 rotates. Or, the jet tab 2A moves from the operation position to the standby position as the rotation shaft 4 rotates.

The gas seal member 6 is arranged on the outer circumferential surface of the rotation shaft 4. The gas seal member 6 is a member that seals a gap between the outer circumferential surface of the rotation shaft 4 and the wall section of the nozzle 1. The gas seal member 6 prevents that the combustion gas exhausted from the nozzle output opening 8 flows into the driving mechanism 5 through the gap between the rear end surface of the nozzle 1 and the jet tab 2A, to protect the driving mechanism 5 and so on.

Next, referring to FIG. 4, the flow of the combustion gas will be described. As mentioned above, most of the combustion gases is exhausted from the nozzle output opening 8 into the rea direction (reference to the arrow of vectored flow GF2 in FIG. 4). Also, as shown by the arrow GA1, the combustion gas partially flows into a gap 9A between the rear end surface of the nozzle 1 and a front end surface of the jet tab 2A from the nozzle output opening 8. A part of the combustion gas flowing into the gap 9A goes around the rotation shaft 4 and is exhausted in a radial direction out of the nozzle, as shown by the arrow GA2. Also, another part of the combustion gas flowing into the gap 9A collides with the rotation shaft 4 and flows toward the gas seal member 6 along the rotation shaft 4 as shown by the arrow GA3. The combustion gas flowing through the gap 9A is hot and a high-speed flow (for example, Mach 1 when the gap 9A functions as a throat). The combustion gas shown by the arrow GA3 is hot and a high-speed flow (for example, Mach 1 or more when the gap 9B between the wall section of the nozzle 1 and the outer circumferential surface of the rotation shaft 4 functions as the gap 9A, i.e. the expansion section downstream of the throat 9). Because the heat transfer coefficient of a high-speed fluid is high, a heat quantity which is transferred to the gas seal member 6 from the combustion gas shown by the arrow GA3 is very large. Therefore, a problem occurs that a thermal load imposed to the gas seal member 6 is large.

Note that FIG. 3 to FIG. 5 show the thrust vectoring apparatus used temporarily to describe the problems recognized by the inventors. Therefore, the thrust vectoring apparatus shown in FIG. 3 to FIG. 5 does not show a prior art before application of the present invention.

Figure 6A:
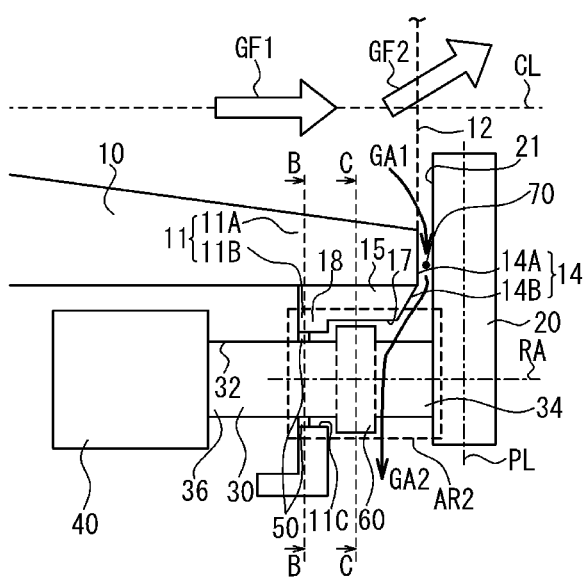
FIG. 6A is a sectional view schematically showing a part of the thrust vectoring apparatus according to an embodiment.
Figure 6B:
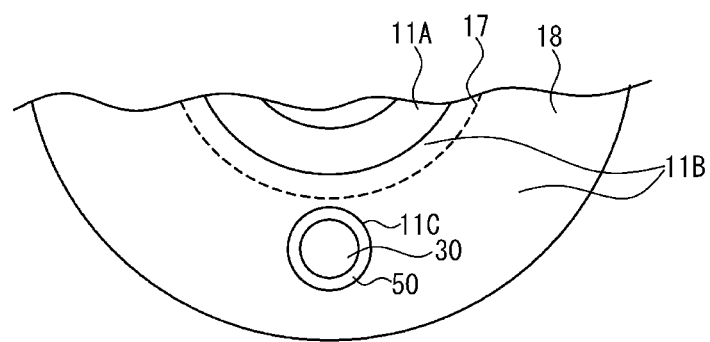
FIG. 6B is a sectional view along the line B-B in FIG. 6A.
Figure 6C:
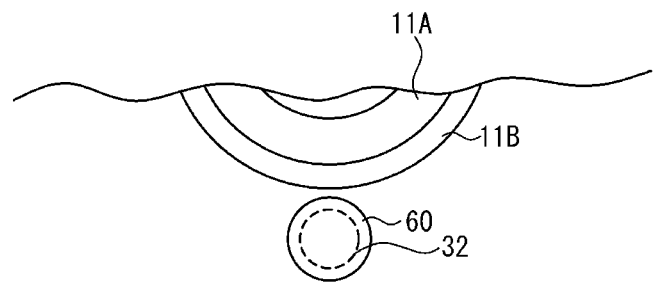
FIG. 6C is a sectional view along the line C-C in FIG. 6A.
Figure 7:
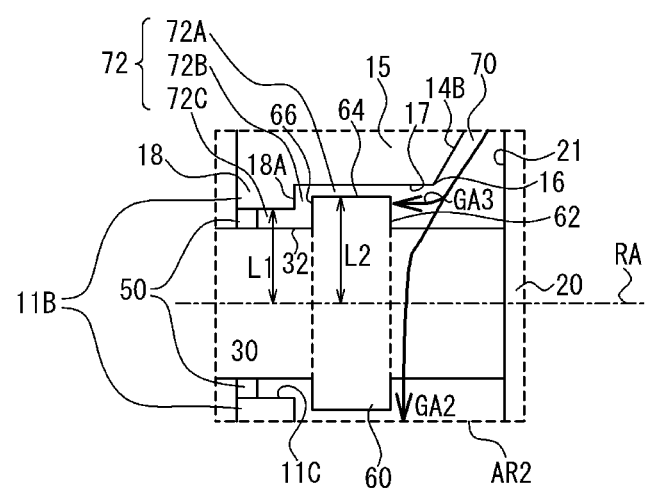
FIG. 7 is a side sectional view schematically showing the thrust vectoring apparatus according to the embodiment and is an expanded view of an area AR2 in FIG. 6A.
Figure 7:
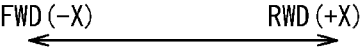

Referring to FIG. 6A to FIG. 7, the thrust vectoring apparatus according to an embodiment will be described. FIG. 6A is a side sectional view schematically showing a part of the thrust vectoring apparatus according to the present embodiment. FIG. 6B is a sectional view of the nozzle along the line B-B of FIG. 6A. FIG. 6C is a sectional view of the nozzle along the line C-C of FIG. 6A. FIG. 7 is a sectional view schematically showing a part of the thrust vectoring apparatus according to the present embodiment and is an expanded view of the area AR2 of FIG. 6A.

The thrust vectoring apparatus of the present embodiment is different from the thrust vectoring apparatus shown in FIG. 3 to FIG. 5 in that a protrusion 60 (a gas seal protection member) is provided to restrain that the combustion gas flows toward the gas seal member 50.

(Outline Configuration of Thrust Vectoring Apparatus)

Referring to FIG. 6A to FIG. 6C, the outline of the thrust vectoring apparatus 200A will be described. FIG. 6A to FIG. 6C show only a part (lower part) of the thrust vectoring apparatus 200A. The thrust vectoring apparatus 200A is provided with a nozzle 10, a jet tab 20, a rotation shaft 30, a driving mechanism 40, a gas seal member 50, and a protrusion 60.

The nozzle 10 has the nozzle output opening 12 from which the combustion gas is emitted into the rear direction (i.e., the +X direction). The jet tab 20 is arranged on the rear side of the nozzle 10 (i.e. the +X direction). The jet tab 20 is connected with the rotation shaft 30 to be rotatable around the rotation axis RA. The driving mechanism 40 rotates the rotation shaft 30 such that the jet tab 20 is driven to be turned between the standby position (the position where the jet tab does not overlap with the nozzle output opening 12) and the operation position (the position where a part of the jet tab 20 overlaps with the nozzle output opening 12). The gas seal member 50 is arranged on the outer circumferential surface 32 of the rotation shaft 30. The gas seal member 50 prevents the combustion gas from invading toward the driving mechanism 40. The rotation shaft 30 is provided with the protrusion 60 on the rear side of the gas seal member 50 (i.e. in the +X direction), to protrude from the rotation shaft 30 in a radial direction.

The jet tab 20 generates a high-pressure region in front of the front end surface 21 of the jet tab 20 when the jet tab 20 is in the operation position. The diagonal shock wave is generated due to the high pressure region, and the combustion gas mainstream GF1 crossing the diagonal shock wave is vectored to generate the vectored flow GF2. The thrust to drive the nozzle 10 (or, a flying object having the nozzle 10) into the forward direction is vectored due to the reaction of vectoring. A part of the combustion gas which is discharged from the nozzle output opening 12 flows into the gap 70 between the rear end surface 14 of the nozzle 10 and the front end surface 21 of the jet tab 20 (reference to the arrow GA1 of FIG. 6A). The combustion gas which flows from the gap 70 is guided by the protrusion 60 (reference to the arrow GA2 of FIG. 6A) to restrain the flow toward the gas seal member 50. That is, the thrust vectoring apparatus according to the present embodiment is a thrust vectoring apparatus which can protect the gas seal member 50.

(Detailed Configuration of Thrust Vectoring Apparatus)

Referring to FIG. 6A to FIG. 6C, the thrust vectoring apparatus 200A will be described in detail. The thrust vectoring apparatus 200A is provided with the nozzle 10, the jet tab 20, the rotation shaft 30, the driving mechanism 40, the gas seal member 50, and the protrusion 60.

(Nozzle)

The nozzle 10 has a nozzle wall section 11. Also, the nozzle wall section 11 has a nozzle main body section 11A and a flange section 11B. The nozzle main body section 11A and the flange section 11B may be configured as a unitary body or may be configured as different bodies. The flange section 11B has a small diameter section 15 and a large diameter section 18 which protrudes outwardly in the radial direction than the outer surface 17 of the small diameter section 15. For example, the small diameter section 15 and the large diameter section 18 have a unitary body and the large diameter section 18 is arranged on the front side of the small diameter section 15. The through-hole 11C is disposed in the large diameter section 18 of the flange section 11B so that the rotation shaft 30 passes through the through-hole 11C. Because the rotation shaft 30 is inserted into the through-hole 11C, the large diameter section 18 is referred to as a rotation shaft receiving member. For example, the material of the nozzle wall section 11 is a composite material, a heat-resistant alloy, or a combination of the composite material and the heat-resistant alloy. As an example of the material of the nozzle wall section 11, the precipitation hardening stainless steel is exemplified.

The nozzle 10 contains the longitudinal center axis CL of the nozzle and the nozzle output opening 12. The nozzle output opening 12 is an outflow port which emits the combustion gas and is a boundary plane which divides the inside of the nozzle and the outside of the nozzle. For example, the nozzle output opening 12 has a plane orthogonal to the longitudinal center axis CL at the nozzle end, and may be defined as a part on the inner side than the inner circumference surface of the nozzle 10 (on the side of longitudinal center axis CL).

In an example, the section shape of the inner circumference of the nozzle 10 which is perpendicular to the longitudinal center axis CL of the nozzle is circular. In another example, the section shape of the inner circumference of the nozzle 10 which is perpendicular to the longitudinal center axis CL has a shape except for the circle. In an example, the section shape of the outer circumferential surface of the nozzle 10 which is perpendicular to the longitudinal center axis CL is circular. In another example, the section shape of the outer circumferential surface of the nozzle 10 which is perpendicular to longitudinal center axis CL has a shape except for the circle.

The nozzle 10 has a rear end surface 14 at the rear end. The rear end surface 14 contains a rear end surface 14A of the nozzle main body section 11A and a rear end surface 14B of the flange section 11B. In FIG. 6A, the rear end surface 14A is a plane which is perpendicular to the longitudinal center axis CL and the rear end surface 14B is an inclined surface which approaches the longitudinal center axis CL in a direction of the read end. However, the present invention is not limited to the example of FIG. 6A. For example, both of the rear end surface 14A and the rear end surface 14B may be a plane which is perpendicular to the longitudinal center axis CL, and both of the rear end surface 14A and the rear end surface 14B may be the inclined surface which approaches the longitudinal center axis CL in the direction of the rea end.

The combustion gas flows through the inside space of the nozzle 10. The combustion gas mainstream GF1 which flows through the inside space of the nozzle 10 is vectored by the jet tab 20 according to the above-mentioned principle to generate the vectored flow GF2. Most of the combustion gas is emitted or exhausted from the nozzle output opening 12 in the rear direction.

(Jet Tab)

The jet tab 20 is arranged behind the nozzle 10. That is, the jet tab 20 is arranged on the rear side of the nozzle output opening 12 (in the +X direction) in the direction along the longitudinal center axis CL of the nozzle 10. In FIG. 6A, only one jet tab 20 is shown but a plurality of jet tabs may be arranged around the longitudinal center axis CL of the nozzle, as in FIG. 5. The number of jet tabs to be arranged is optional. Note that it is desirable that the jet tabs 20 are arranged in regular intervals around the longitudinal center axis CL. The jet tab 20 has a front end surface 21 with which the combustion gas emitted from the nozzle output opening 12 collides. For example, the front end surface 21 of the jet tab 20 is a plane which is perpendicular to the longitudinal center axis CL. A gap 70 is formed between the front end surface 21 and the rear end surface 14 of the nozzle. The gap 70 functions as a clearance when the jet tab 20 moves between the standby position and the operation position. For example, the material of the jet tab 20 is a heat-resistant alloy.

(Rotation Shaft and Driving Mechanism)

The rotation shaft 30 and the driving mechanism 40 are used to drive the jet tab 20 between the standby position and the operation position. A distant end 34 (rear end) of the rotation shaft 30 is connected to the jet tab 20. The rotation shaft 30 and the jet tab 20 may be connected as a unitary part and may be connected as different parts. The rotation shaft 30 (for example, the proximal end 36 of the rotation shaft 30 in FIG. 6A) is connected to the driving mechanism 40 to be a power transferable. The output axis of the driving mechanism 40 may be directly connected to the rotation shaft 30 and may be connected to the rotation shaft 30 through a power transfer mechanism such as a deceleration mechanism. For example, the driving mechanism 40 is a motor. By transferring the power of the driving mechanism 40 to the rotation shaft 30, the rotation shaft 30 is driven to be rotated together with the jet tab 20. The jet tab 20 moves from the standby position to the operation position by the rotation shaft 30 rotating around a rotation axis RA. Or, the jet tab 20 moves from the operation position to the standby position by the rotation shaft 30 rotating around the rotation axis RA. For example, the material of the rotation shaft 30 is a heat-resistant alloy. Note that the rotation shaft 30 is supported by a bearing member (not shown) to be rotatable.

The rotation axis RA of the rotation shaft 30 is parallel to the longitudinal center axis CL of the nozzle in FIG. 6A. The jet tab 20 is rotatable around the rotation axis RA in a plane PL which is perpendicular to the rotation axis RA. In this case, the longitudinal center axis CL of the nozzle and the plane PL intersect perpendicularly. However, the direction of the rotation axis RA is not limited to an example of FIG. 6A. The rotation axis RA and the longitudinal center axis CL of the nozzle may not be perfectly parallel. In this case, the longitudinal center axis CL of the nozzle and the plane PL intersect but the longitudinal center axis CL and the plane PL are not perpendicular.

(Gas Seal Member)

The gas seal member 50 is arranged on the outer circumferential surface 32 of the rotation shaft 30. The gas seal member 50 is a member to seal the gap between the outer circumferential surface 32 of the rotation shaft 30 and the nozzle wall section 11. The gas seal member 50 is arranged between the outer circumferential surface 32 of the rotation shaft 30 and the inner surface of the through-hole 11C disposed in the nozzle wall section 11 (in detail, the through-hole 11C is provided for the flange section 11B of the nozzle wall section 11. Moreover, in detail, the through-hole 11C is provided for the large diameter section 18 of the flange section 11B. See FIG. 6B, if necessary. Note that in FIG. 6B, a reference numeral 17 showing an outer surface of the small diameter section indicates a virtual line). The gas seal member 50 prevents the combustion gas exhausted from the nozzle output opening 12 from flowing toward the driving mechanism 40 and protects the driving mechanism 40 and so on. For example, the gas seal member 50 is an O-ring. For example, the section shape of the O-ring on a plane which is perpendicular to the O-ring is circular. For example, the material of the gas seal member 50 is heat-resistant rubber such as Perfluoroelastomer (FFKM).

(Protrusion)

The rotation shaft 30 has the protrusion 60 which protrudes in the radial direction out of the rotation shaft 30 on the rear side of the gas seal member 50. In the example of FIG. 6A, the protrusion 60 is formed as a unitary body together with the rotation shaft 30. Alternatively, the protrusion 60 may be formed as a part different from the rotation shaft 30, and may be connected with the rotation shaft 30 by the fastening member and so on. For example, the protrusion 60 is an annular protrusion (reference to FIG. 6C, if necessary. Note that in FIG. 6C, a reference numeral 32 showing the outer circumferential surface of the rotation shaft 30 indicates a virtual line). The annular protrusion may be represented as a ring type protrusion. The protrusion 60 restrains that the combustion gas which flows from the gap 70 flows toward the gas seal member 50 (referring to the arrow GA2 of FIG. 6A). For example, the material of the protrusion 60 is a heat-resistant alloy.

(Flow of Combustion Gas and Detailed Structure of Protrusion)

Referring to FIG. 7, the flow of combustion gas and the detailed structure of the protrusion will be described. FIG. 7 is a side sectional view schematically showing the thrust vectoring apparatus according to the embodiment and is an expanded view of the area AR2 of FIG. 6A.

A part of the combustion gas flows from the nozzle output opening to the gap 70 between the rear end surface (the rear end surface 14B of the flange section 11B) of the nozzle and the front end surface 21 of the jet tab 20. The part of the combustion gas which flows into the gap 70 goes around the rotation shaft 30 and is exhausted in the radial direction out of the nozzle, as shown by arrow GA2. The flow of the combustion gas shown by the arrow GA2 is guided by the protrusion 60 and is more surely exhausted in the radial direction out of the nozzle. Also, the part of the combustion gas which flows into the gap 70 collides with the rotation shaft 30, and flows along the rotation shaft 30 as shown by the arrow GA3. The flow of the combustion gas along the rotation shaft 30 is interfered by the protrusion 60 to restrain that the flow of the combustion gas is directed for the gas seal member 50.

For example, the protrusion 60 has a rear end surface 62, an outer circumferential surface 64, and a front end surface 66. For example, the rear end surface 62 is a plane which is perpendicular to the rotation axis RA. Alternatively, the rear end surface 62 may be an inclined surface or a curved surface which is arranged to incline toward the rotation axis RA. For example, the outer circumferential surface 64 is a circular cylinder surface. Alternatively, the outer circumferential surface 64 may be a part of a cone surface. For example, the front end surface 66 is a plane which is perpendicular to the rotation axis RA.

The rear end surface 62 of the protrusion 60 is positioned in the forward direction than the outer circumferential edge 16 of the rear end surface 14 (rear end surface 14B) of the nozzle 10. In other words, the shortest distance between the outer circumferential edge 16 of the rear end surface 14 of the nozzle 10 and the front end surface 21 of the jet tab 20 (the distance along the rotation axis RA) is shorter than the shortest distance between the rear end surface 62 of the protrusion 60 and the front end surface 21 of the jet tab 20 (the distance along the rotation axis RA). It is possible to smoothly guide the combustion gas which flows from the gap 70 to the direction of the arrow GA2 by arranging the rear end surface 62 in this way. Therefore, a quantity of the combustion gas flowing in the direction of the gas seal member 50 can be reduced. Also, it becomes possible that the flow of combustion gas shown by the arrow GA3 collides with the rear end surface 62 more surely so that the flow of combustion gas can be decelerated, by arranging the rear end surface 62 as described above (i.e. by arranging the rear end surface 62 in the forward direction of the outer circumferential edge 16). Therefore, even if the part of the combustion gas which flows from the gap 70 passes through the gaps 72A and 72B between the flange section 11B of the nozzle 10 and the protrusion 60 and the gap 72C between the inner surface of the through-hole 11C of the flange section 11B and the outer circumferential surface 32 of the rotation shaft 30 toward the gas seal member 50, a heat transfer coefficient for a part of the combustion gas becomes low because the flow of the part of the combustion gas is decelerated. As a result, a thermal load which is applied to the gas seal member 50 can be made small.

The outer diameter of the protrusion 60 (2×L2, in other words, twice of the distance between the rotation axis RA and the outer circumferential edge of the protrusion 60) is larger than the inner diameter of the through-hole 11C of the flange section 11B (2×L1, in other words, twice of the distance between the rotation axis RA and the inner surface of the through-hole 11C). By setting the outer diameter L2 of the protrusion 60 in this way, it becomes possible to more surely decelerate the flow of combustion gas through the gap 72A by the combustion gas colliding with the rear end surface 18A of the large diameter section 18. Also, a passage which is configured from the gap 72 (the gaps 72A, 72B and 72C) is a bent passage (i.e. a labyrinth passage). Because the length of the bent passage is long, the combustion gas which flows through the bent passage is more surely decelerated due to a friction with the passage surface and so on. Therefore, even if a part of the combustion gas which flows from the gap 70 passes through the gaps 72A and 72B between the flange section 11B of the nozzle 10 and the protrusion 60 and through the gap 72C between the inner surface of the through-hole 11C of the flange section 11B and the outer circumferential surface 32 of the rotation shaft 30 in the direction of the gas seal member 50, the heat transfer coefficient of the part of the combustion gas flow becomes low because the part of the combustion gas is decelerated. As a result, thermal load which is applied to the gas seal member 50 can be made small.

As described above, in the thrust vectoring apparatus according to the present embodiment, because the quantity of the combustion gas toward the gas seal member 50 is reduced, the combustion gas toward the gas seal member 50 is decelerated, so that it is possible to reduce the thermal load applied to the gas seal member 50 and to protect the gas seal member 50.

Figure 8:
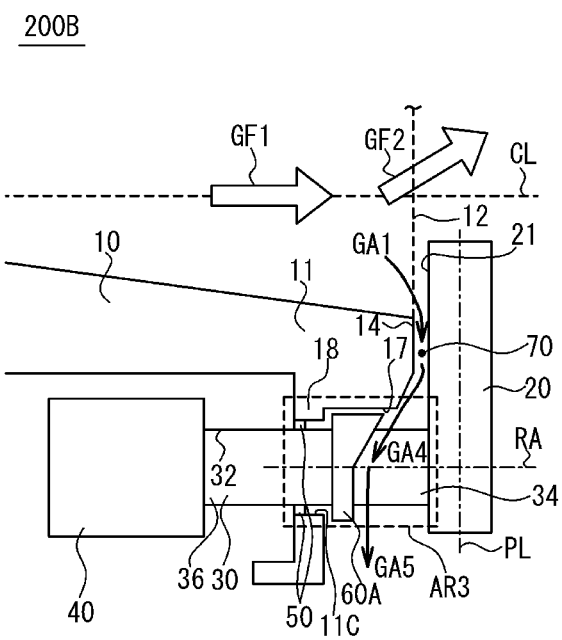
FIG. 8 is a side sectional view schematically showing a part of the thrust vectoring apparatus according to the embodiment.
Figure 9:
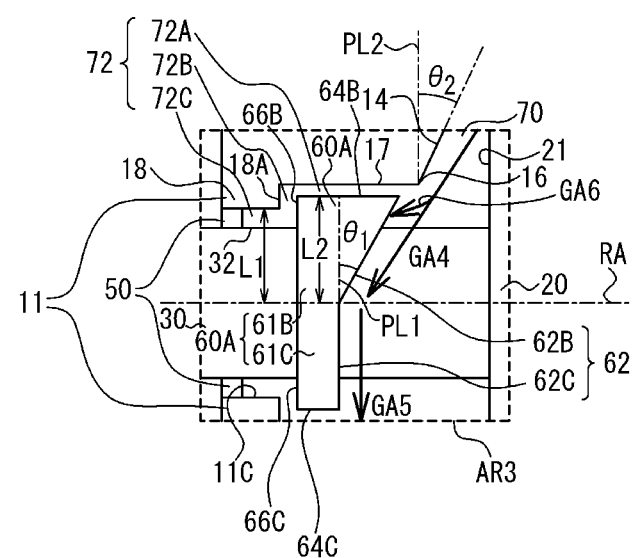
FIG. 9 is a side sectional view schematically showing the thrust vectoring apparatus according to the embodiment and is an expanded view an area AR3 in FIG. 8.

Referring to FIG. 8 and FIG. 9, a modification example of the present embodiment will be described. FIG. 8 is a side sectional view schematically showing a part of the thrust vectoring apparatus of the present embodiment. FIG. 9 is a side sectional view schematically showing a part of the thrust vectoring apparatus of the present embodiment and is an expanded view of the area AR3 of FIG. 8. Note that in the present embodiment shown in FIG. 8 and FIG. 9 (modification example), the same components as those of the present embodiment shown in FIG. 6A to FIG. 7 are assigned with the same reference numerals.

As understood from FIG. 8, the protrusion 60A of the thrust vectoring apparatus 200B of the modification example is different from the protrusion 60 of the thrust vectoring apparatus 200A of the embodiment shown in FIG. 6A to FIG. 7 in the shape. The flow of the combustion gas guided by the rear end surface of the protrusion 60A is shown by an arrow GA4 and an arrow GA5.

Also, an example in which the nozzle main body section and the flange section of the nozzle wall section 11 are configured unitarily is shown in FIG. 8. However, the nozzle main body section and the flange section may be different bodies. Note that because the rotation shaft 30 is inserted into the through-hole 11C of the large diameter section 18 of the flange section, the large diameter section 18 can be referred to as a rotation shaft receiving member. Moreover, in FIG. 8, an example in which the rotation shaft 30 and the protrusion 60A are different bodies has been described. However, the rotation shaft 30 and the protrusion 60A may be unitary.

(Flow of Combustion Gas and Detailed Structure of Protrusion)

Referring to FIG. 9, the flow of the combustion gas and the detailed structure of the protrusion in the modification example will be described.

A part of the combustion gas flows from the nozzle output opening into the gap 70 between the rear end surface 14 of the nozzle and the front end surface 21 of the jet tab 20. The part of the combustion gas which flows into the gap 70 goes around the rotation shaft 30 as shown by the arrow GA4 and the arrow GA5 and is exhausted in the radial direction out of the nozzle. The flow of the combustion gas shown by the arrow GA4 and the arrow GA5 is guided by the protrusion 60A and is more surely exhausted in the radial direction out of the nozzle. Also, the part of the combustion gas which flows into the gap 70 collides with the rotation shaft 30 and flows along the rotation shaft 30 as shown by arrow GA6. The flow of the combustion gas along the rotation shaft 30 is prevented by the protrusion 60A and it is restrained that the flow of the combustion gas advances for the gas seal member 50.

The protrusion 60A has an inclination section 61B and a flat section 61C. Alternatively, the protrusion 60A may have the inclination section 61B as the whole. For example, the protrusion 60A is an annular protrusion. For example, the inclination section 61B has a rear end surface 62B, an outer circumferential surface 64B, and a front end surface 66B. The rear end surface 62B has an inclined surface which inclines to the plane PL1 which is perpendicular to the rotation axis RA of the rotation shaft 30. The inclined surface is an inclined surface which largely inclines on the front side in the radial direction out of the nozzle in the state that the rotation shaft 30 is rotated around rotation axis RA so that an overlap area of the jet tab 20 and the nozzle output opening become maximum (in other words, it is an inclined surface which approaches the longitudinal center axis CL of the nozzle into the rear direction). For example, the outer circumferential surface 64B is a part of the circular cylinder surface. Alternatively, the outer circumferential surface 64B may be a part of a cone surface. For example, the front end surface 66B is a plane which is perpendicular to the rotation axis RA. For example, the flat section 61C has a rear end surface 62C, an outer circumferential surface 64C, and a front end surface 66C. The rear end surface 62C is a plane which is perpendicular to the rotation axis RA of the rotation shaft 30. For example, the outer circumferential surface 64C is a part of the circular cylinder surface. Alternatively, the outer circumferential surface 64C may be a part of the cone surface. For example, the front end surface 66C is a plane which is perpendicular to the rotation axis RA.

The rear end surface 62 (62B, 62C) of the protrusion 60A is positioned on the forward side than the outer circumferential edge 16 of the rear end surface 14 of the nozzle 10. In other words, the shortest distance between the outer circumferential edge 16 of the rear end surface 14 of the nozzle 10 and the front end surface 21 of the jet tab 20 (the distance along the rotation axis RA) is smaller than the shortest distance between the rear end surface 62 (62B, 62C) of the protrusion 60A and the front end surface 21 of the jet tab 20 (the distance along the rotation axis RA). The combustion gas which flows from the gap 70 can be smoothly led to the direction of the arrow GA4 and the arrow GA5 by arranging the rear end surface 62 (62B, 62C) in this way. Therefore, a quantity of the combustion gas toward the gas seal member 50 is reduced. Also, the flow of the combustion gas which is shown by the arrow GA6 more surely collides with the rear end surface 62B to be decelerated by arranging the rear end surface 62 (62B, 62C) as mentioned above (that is, by arranging the rear end surface 62 on the front side of the outer circumferential edge 16). Therefore, even if the part of the combustion gas which flows from the gap 70 passes through the gaps 72A and 72B between the nozzle wall section 11 of the nozzle 10 and the protrusion 60A and moreover through the gap 72C between the inner surface of the through-hole 11C of the nozzle wall section 11 and the outer circumferential surface 32 of the rotation shaft 30 toward the gas seal member 50, the heat transfer coefficient of the part of the combustion gas flow becomes low because the part of the combustion gas is decelerated. As a result, the thermal load which is applied to the gas seal member 50 can be made small.

The combustion gas which flows from the outer circumferential edge 16 of the rear end surface 14 of the nozzle 10 into the radial direction out of the nozzle expands more from a position which exceeds the outer circumferential edge 16. Therefore, to guide the expanded flow of the combustion gas more smoothly, it is desirable to increase the inclination angle of the rear end surface 62B. That is, an angle between the plane PL1 which is perpendicular to the rotation axis RA and the rear end surface 62B (inclined plane) of the inclination section 61B is defined as θ1, and an angle between the plane PL2 which is perpendicular to the rotation axis RA and the outer circumferential edge of the rear end surface 14 of the nozzle is defined as θ2. At that time, it is desirable that the angle θ1 is larger than the angle θ2 (θ1>θ2). By setting the angle θ1 and the angle θ2 in this way, the combustion gas flows in the radial direction out of the nozzle beyond the outer circumferential edge 16 of the rear end surface 14 of the nozzle 10, and it becomes possible to guide the expanded flow of the combustion gas more smoothly along the rear end surface 62B (refer to the arrow GA4).

The rear end surface 62C of the flat section 61C vectors the flow of the combustion gas in the forward direction and the radial direction out of the nozzle shown by the arrow GA4. The rear end surface 62C leads the flow of the combustion gas more surely to the radial direction out of the nozzle shown by the arrow GA5.

The outer diameter of the protrusion 60A (2×L2, namely, twice of the distance between the rotation axis RA and the outer circumferential edge of the protrusion 60A) is larger than the inner diameter of the through-hole 11C of the nozzle wall section 11 (2×L1, namely, twice of the distance between the rotation axis RA and the inner surface of the through-hole 11C). By setting the outer diameter of the protrusion 60A in this way, it becomes possible to make the combustion gas which flows through the gap 72A collide with the rear end surface 18A of the large diameter section 18 more surely to decelerate the part of the combustion gas. Also, the passage which is configured by the gap 72 (the gap 72A, the gap 72B and the gap 72C) is a bent passage (i.e. a labyrinth passage). Because the length of the bent passage is long, the combustion gas which flows through the bent passage is more surely decelerated by the friction with the passage surface and so on. Therefore, even if a part of the combustion gas which flows from the gap 70 passes through the gaps 72A and 72B between the nozzle wall section 11 of the nozzle 10 and the protrusion 60A, and through the gap 72C between the inner surface of the through-hole 11C of the nozzle wall section 11 and the outer circumferential surface 32 of the rotation shaft 30 in the direction to the gas seal member 50, the heat transfer coefficient of the part of the combustion gas becomes low, because the part of the combustion gas is decelerated. As a result, the thermal load which is applied to the gas seal member 50 can be made small.

Figure 10A:
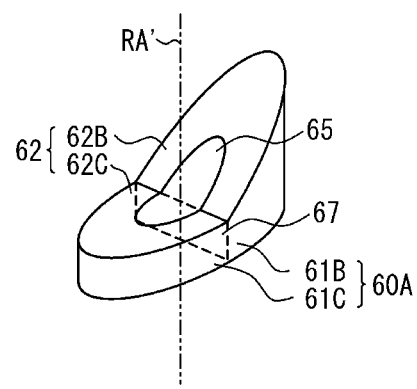
FIG. 10A is a perspective view schematically showing of a protrusion.

FIG. 10A is a perspective view schematically showing the protrusion 60A. The through-hole 65 is formed in the protrusion 60A such that the rotation shaft 30 is inserted therein. The rotation shaft 30 and the protrusion 60A are coupled by an optional fastening means. In an example of FIG. 10A, the boundary surface 67 between the inclination section 61B and the flat section 61C passes a central axis RA' of the protrusion 60A. That is, the one-side of the plane which passes the central axis RA' (note that the center axis RA' and the rotation axis RA of the rotation shaft 30 are coincident) is the inclination section 61B which has the rear end surface 62B, and the other side of the plane which passes the rotation axis RA is the flat section 61C which has the rear end surface 62C. However, the position of the boundary surface 67 between the inclination section 61B and the flat section 61C is not limited to an example of FIG. 10A.

Figure 10B:
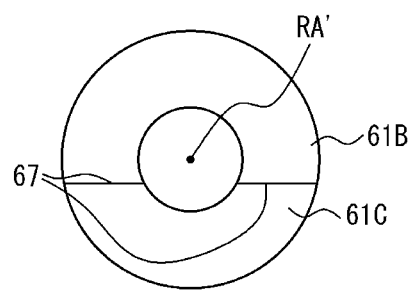
FIG. 10B is a sectional view schematically showing the protrusion.

FIG. 10B is a sectional view of the protrusion 60A and shows the section which is perpendicular to the central axis RA' through an optional point in the flat section 61C. As shown in FIG. 10B, in case that the boundary surface 67 overlaps with the central axis RA' or is on the side of the flat section 61C beyond the central axis RA' (namely, when the cross section of the inclination section 61B is larger than the cross section of the flat section 61C in the section which is perpendicular to the central axis RA' and passes through an optional one point in the flat section 61C), it becomes possible to guide the flow of the combustion gas more surely along the rear end surface 62B. As a result, it becomes possible to reduce a quantity of the combustion gas which heads for the gas seal member 50 more surely.

As described above, the thrust vectoring apparatus according to the present embodiment can reduce the thermal load which is applied to the gas seal member 50 to protect the gas seal member 50 by reducing the quantity of the combustion gas which heads for the gas seal member 50 and moreover decelerating the combustion gas toward the gas seal member 50.

Figure 11A:
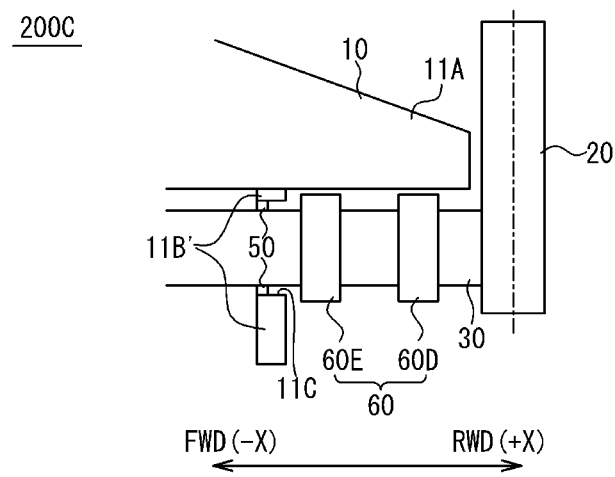
FIG. 11A is a side sectional view schematically showing a part of the thrust vectoring apparatus according to the embodiment.

Referring to FIG. 11A, a modification example of the embodiment will be described. FIG. 11A is a sectional view schematically showing a part of the thrust vectoring apparatus according to an embodiment. Note that in the embodiment (the modification example) shown in FIG. 11A, the same components as those of the embodiment shown in FIG. 6A to FIG. 7 are assigned with the same reference numerals.

As seen from FIG. 11A, in the thrust vectoring apparatus 200C according to the modification example, two protrusions 60D and 60E are provided. The two protrusions 60D and 60E are provided along the longitudinal direction of the rotation shaft 30 to be apart from each other. By providing the two protrusions, the deceleration of the combustion gas becomes surer. Therefore, in the thrust vectoring apparatus according to the embodiment (the modification example), the thermal load which is applied to the gas seal member can be reduced and the gas seal member can be protected. Note that the number of protrusions may be equal to or more than three.

Also, the flange section 11B' differs from the flange section of the embodiment shown in FIG. 6A to FIG. 7 in the shape in the modification example shown in FIG. 11A. The flange section 11B' has a substantially circular plate shape or a substantially ring shape. The through-hole 11C is provided in the position of the flange section 11B' in correspondence to of the rotation shaft 30 so that the rotation shaft 30 is inserted. The flange section 11B' is referred to as a rotation shaft receiving member because the rotation shaft 30 is inserted into the through-hole 11C.

Figure 11B:
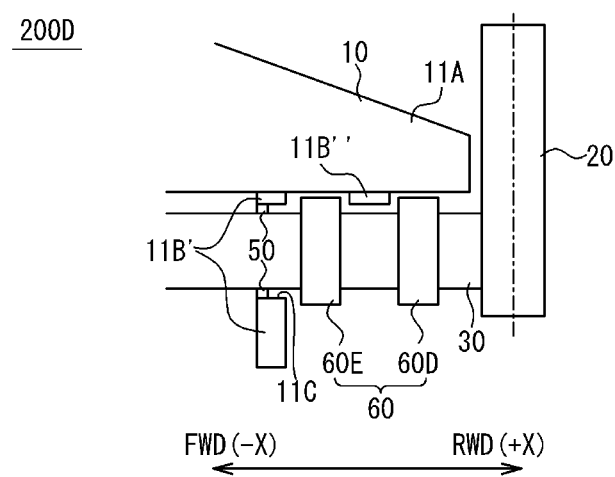
FIG. 11B is a side sectional view schematically showing a part of the thrust vectoring apparatus according to the embodiment.

Referring to FIG. 11B, a modification example according to the embodiment will be described. FIG. 11B is a side sectional view schematically showing a part of the thrust vectoring apparatus in the embodiment. Note that in (the modification example of) the embodiment shown in FIG. 11B, the same components as those of the embodiment shown in FIG. 11A are assigned with the same reference numerals.

As seen from FIG. 11B, in the thrust vectoring apparatus 200D of the modification example, a second flange section 11B" is provided between the two protrusions 60D and 60E. By providing the second flange section 11B", the length of the bent passage is extended and also the number of times of bending of the bent passage increases. Therefore, the deceleration of the combustion gas becomes surer. Therefore, the thermal load which is applied to the gas seal member is reduced and it becomes possible to protect the gas seal member, in the thrust vectoring apparatus according to (the modification example of) the embodiment.

Figure 12:
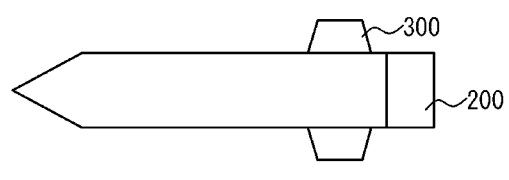
FIG. 12 is a side view schematically showing a flying object.

FIG. 12 is a side view schematically showing a flying object. The flying object 1000 has the thrust vectoring apparatus 200 and steering wings 300. As the thrust vectoring apparatus 200, the thrust vectoring apparatus in the above-mentioned embodiments (e.g. the thrust vectoring apparatus 200A, 200B, 200C, or 200D) can be adopted. The thermal load which is applied to the gas seal member is reduced and it becomes possible to protect the gas seal member in the flying object according to the embodiment. Therefore, the flying object with a high reliability can be provided. Note that the flying object may be a missile and may be other one.

The present invention is not limited to the above embodiments and that it would be understood that the present invention can be modified or changed from each embodiment appropriately in the range of the technical thought of the present invention. Also, unless the technical contradiction is caused, various techniques used in each of the embodiments and the modification examples may be combined.

What is claimed is:

1. A thrust vectoring apparatus comprising:
a nozzle having a nozzle output opening which emits a combustion gas in a rear direction;
a jet tab arranged on a rear side of the nozzle;
a rotation shaft connected to the jet tab to be rotatable around a rotation axis;
a driving mechanism configured to rotate the rotation shaft around the rotation axis; and
a gas seal member arranged on an outer circumferential surface of the rotation shaft to prevent the combustion gas from invading the driving mechanism,
wherein the jet tab is configured to rotate in a plane which intersects with a longitudinal center axis of the nozzle, by rotating the rotation shaft around the rotation axis, and to move from a standby position where the jet tab does not overlap with the nozzle output opening, to an operation position where the jet tab overlaps with the nozzle output opening,
wherein a first gap is formed between the jet tab and a surface of a rear end surface of the nozzle, and
wherein the rotation shaft has a protrusion arranged on a rear side of the gas seal member, and the protrusion protrudes in a radial direction from the rotation shaft.

2. The thrust vectoring apparatus according to claim 1, wherein the protrusion is an annular protrusion.

3. The thrust vectoring apparatus according to claim 2, further comprising:
a rotation shaft receiving member having a through-hole in which the rotation shaft is inserted,
wherein the gas seal member is arranged between an outer circumferential surface of the rotation shaft and the inner surface of the through-hole, and
wherein an outer diameter of the annular protrusion is larger than an inner diameter of the through-hole.

4. The thrust vectoring apparatus according to claim 1, wherein the rear end surface of the protrusion is located in a forward direction from the outer circumferential edge of a rear end surface of the nozzle.

5. The thrust vectoring apparatus according to claim 1, wherein the protrusion has an inclination section,
wherein the rear end surface of the inclination section is a first inclination surface which inclines in a forward direction along a radial direction from a longitudinal center axis of the nozzle.

6. The thrust vectoring apparatus according to claim 5, wherein the protrusion has a flat section, and
wherein the flat section is located in the radial direction from the inclination section, when the jet tab is in an operation position.

7. The thrust vectoring apparatus according to claim 5, wherein the rear end surface of the nozzle has a second inclined surface which inclines in the forward direction along the radial direction out of the nozzle, and
wherein an angle between a first surface which is perpendicular to the rotation axis and a first inclined surface is greater than an angle between the second inclined surface and a second surface which is parallel to the first surface.

8. The thrust vectoring apparatus according to claim 1, wherein a plurality of said protrusions are provided for the rotation shaft to be apart from one after another along the longitudinal direction of the rotation shaft.

9. The thrust vectoring apparatus according to claim 1, further comprising:
a bent passage configured to decelerate a flow of the combustion gas which goes around the protrusion and advances for the gas seal.

10. A flying object comprising:
steering wings connected to a main body of the flying object; and
a thrust vectoring apparatus,
wherein said thrust vectoring apparatus comprises:
a nozzle having a nozzle output opening which emits a combustion gas in a rear direction;
a jet tab arranged on a rear side of the nozzle;
a rotation shaft connected to the jet tab to be rotatable around a rotation axis;
a driving mechanism configured to rotate the rotation shaft around the rotation axis; and
a gas seal member arranged on an outer circumferential surface of the rotation shaft to prevent the combustion gas from invading the driving mechanism,
wherein the jet tab is configured to rotate in a plane which intersects with a longitudinal center axis of the nozzle, by rotating the rotation shaft around the rotation axis, and to move from a standby position where the jet tab does not overlap with the nozzle output opening, to an operation position where the jet tab overlaps with the nozzle output opening,
wherein a first gap is formed between the jet tab and a surface of a rear end surface of the nozzle, and
wherein the rotation shaft has a protrusion arranged on a rear side of the gas seal member, and the protrusion protrudes in a radial direction from the rotation shaft.

11. A thrust vectoring apparatus comprising:
a nozzle having a nozzle output opening configured to emit a combustion gas in a rear direction;
a jet tab arranged on a rear side of the nozzle;
a rotation shaft connected to the jet tab to be rotatable around a rotation axis;
a rotation shaft receiving member having a through-hole in which the rotation shaft is inserted;
a driving mechanism configured to rotate the rotation shaft around the rotation axis; and
a gas seal member arranged between an outer circumferential surface of the rotation shaft and an inner surface of the through-hole,
wherein the rotation shaft has an annular protrusion protruding in a radial direction out of the rotation shaft between the gas seal member and the jet tab,
wherein an outer diameter of the annular protrusion is larger than an inner diameter of the through-hole,
wherein a first gap is formed between the jet tab and the rear end surface of the nozzle, and
wherein the shortest distance between an outer circumferential edge of the rear end surface of the nozzle and the jet tab is smaller than the shortest distance between the rear end surface of the annular protrusion and the jet tab.

* * * * *